No. 873,331.
PATENTED DEC. 10, 1907.
F. M. SLETTO.
ANIMAL TRAP.
APPLICATION FILED MAY 25, 1907.
2 SHEETS—SHEET 1.
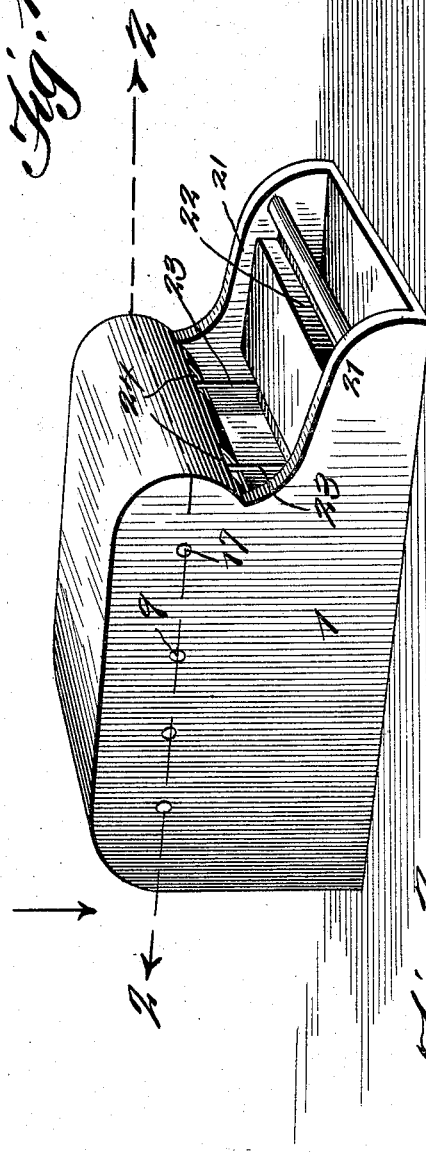
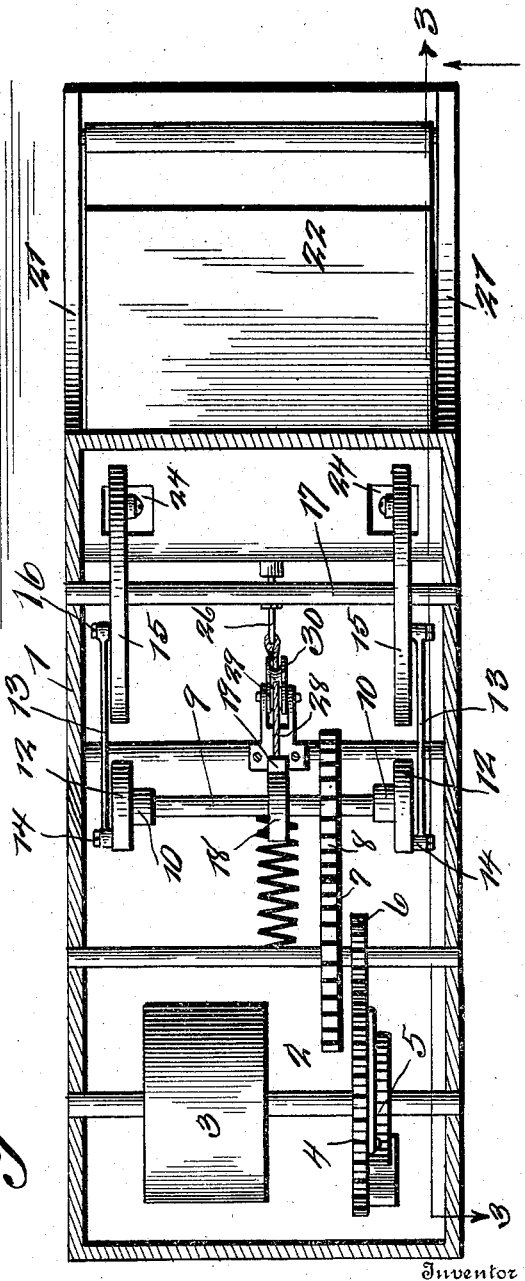
Witnesses
Inventor
F. M. Sletto.
By Dean Swift
Attorney No. 873,331.
PATENTED DEC. 10, 1907.
F. M. SLETTO.
ANIMAL TRAP.
APPLICATION FILED MAY 25. 1907.
2 SHEETS—SHEET 2.
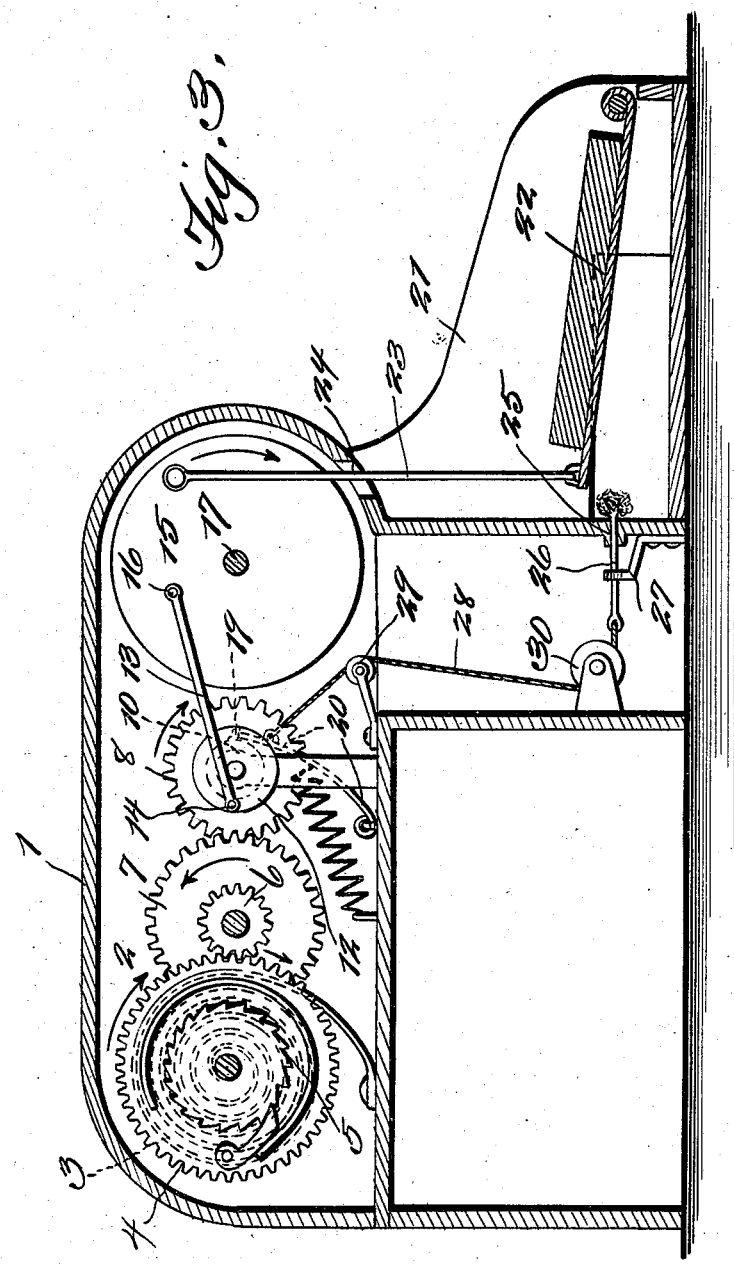
Witnesses
R. A. Boswell.
M. O. Bowling.
Inventor
F. M. Sletto
By Dean Swift
Attorney

UNITED STATES PATENT OFFICE.

FRED M. SLETTO, OF MOSCOW, IDAHO.

ANIMAL-TRAP.

No. 873,331.      Specification of Letters Patent.      Patented Dec. 10, 1907.

Application filed May 25, 1907. Serial No. 375,711.

To all whom it may concern:

Be it known that I, FRED M. SLETTO, a citizen of the United States, residing at Moscow, in the county of Latah and State of Idaho, have invented a certain new and useful Animal-Trap, of which the following is a specification, reference being had therein to the accompanying drawings.

This invention pertains to a new and useful animal-trap the object of the invention is to produce a simple, inexpensive and positively acting trap, which is specially adapted for catching small animals, for instance such as moles, rats and the like, and when sprung, is very sure to kill the animal.

Furthermore, this invention comprises a device of this character which is operated by a suitable spring motor, such as that shown.

With these and other objects in view, the invention comprises combinations of parts and features, which will be hereinafter described, and claimed and shown in the accompanying drawings, in which, Figure 1 is a perspective view of the improved trap. Fig. 2 is a sectional view on line 2—2 of Fig. 1. Fig. 3 is a sectional view on line 3—3 of Fig. 2.

Referring specifically to the several views of the drawings, in which numerals of reference indicate different parts thereof, 1 designates the casing of the trap, in which a suitable spring motor 2 is fixed; this spring motor comprises a spring 3, a gear and ratchet 4 and 5, and a chain of gears 6, 7 and 8, as clearly shown. The spring motor can be of any conventional form. The gear 8 is mounted upon the shaft 9, which is journaled in suitable bearings 10, as clearly shown in Fig. 2. Fixed to the end of the shaft 9, is a pair of disks 12, which have pitman rods 13 pivoted eccentrically thereto, as at 14; these pitman rods are pivoted eccentrically to the disks 15, as at 16, which disks 15 are mounted upon the shaft 17, as clearly shown in Figs. 2 and 3. Also mounted upon the shaft 9, is a disk 18, which is provided with a radiating tooth or lug 19, which is to be engaged by the spring-actuated member 20, as shown more clearly in Fig. 3.

The front portion of the casing is provided with side walls 21, which form a channel in which is pivoted the oscillatory weighted plate 22, which is actuated by the rocking movement of the disk 15 through the medium of the rods 23, which have movement through openings 24, of the casing.

The rear wall of the channel and which forms a part of the casing of the device is provided with an aperture 25, through which the rod 26 has movement. This rod also has movement through a bracket arm 27, as clearly shown in Fig. 3. Connecting this rod 26 and the spring-actuated member 20, is a cord or cable 28, which travel over the pulleys 29 and 30, which are journaled in suitable bearings of the apparatus.

The trap is designed to kill the animal by pressure, which is obtained by the oscillation of the plate 22. The oscillation of the plate is caused by actuating the rod 26 upon the end of which, the bait for trapping the animal is fixed. The animal enters the channel under the plate 22, and begins nibbling the bait, and when a pulling action is exerted upon the rod 26, the spring-actuated member 20 is released from engagement with the tooth 19 of the disk 18, this disconnection thereof, causes one revolution of the said disk 18, which in turn, releases the tension of the spring motor, thereby causing the disks 12 to rock the disks 15, which in turn, oscillate the plate 22, by which the animal is killed.

Having thus described the invention, what is claimed as new and useful, is,

1. An animal trap, comprising motor-operated disks, rocking disks, having pitman rod connections with the motor-operated disks, an oscillatory plate operated thereby, and means to be actuated by an animal for releasing the motor-operated disks substantially as and for the purpose described.

2. The combination in an animal trap, of a spring motor, disks operated thereby, said trap having in the forward part thereof, a shaft provided with rocking disks having pitman rod connections with the first-named disks, a disk 18 mounted on shaft 9 having a radiating tooth, an oscillatory plate and means for coöperating with the disk having the tooth for releasing the same, substantially as and for the purpose set forth.

3. The combination in an animal trap, of a spring motor, disks operated thereby, rocking disks having pitman rod connections with the first-named disks, said trap having a shaft in rear of the first mentioned shaft provided with a disk having a radiating tooth, an oscillatory plate, a spring actuated member designed for engagement with the tooth, and a bait carrying rod having a cord connection with the spring actuated member, the said bait carrying rod when operated disengages the spring actuated member from the said tooth so that the disks will operate the oscillatory plate.

In testimony whereof I hereunto affix my signature in presence of two witnesses.

FRED M. SLETTO.

Witnesses:
JOSEPH D. HAMPTON,
W. N. BUCHANAN.